Aug. 28, 1951 — F. P. FORSS — 2,566,183
PORTABLE POWER DRIVEN TOOL
Filed May 29, 1947
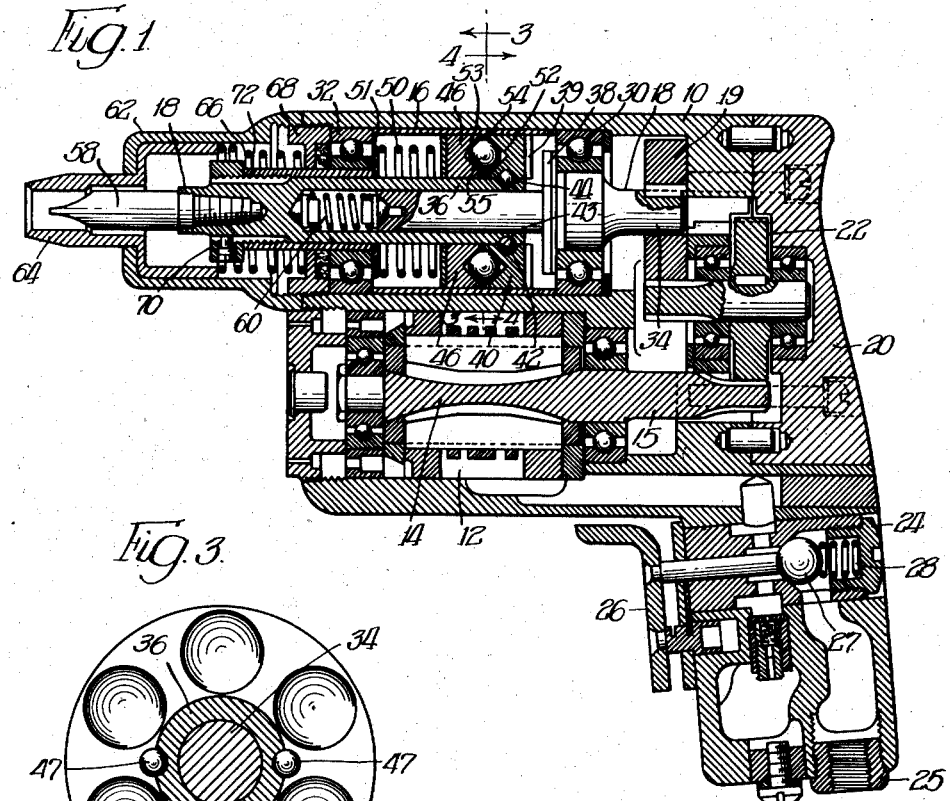
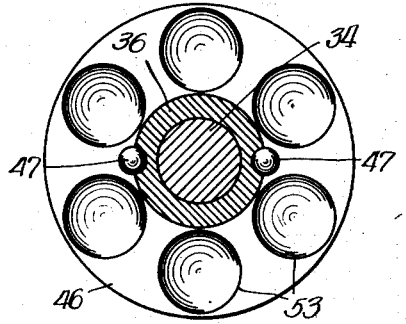
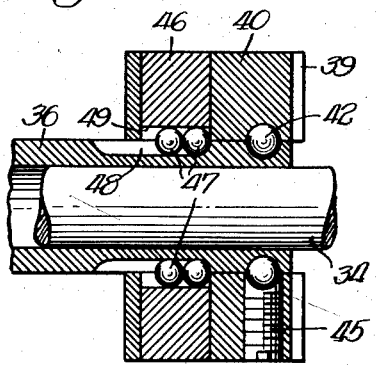
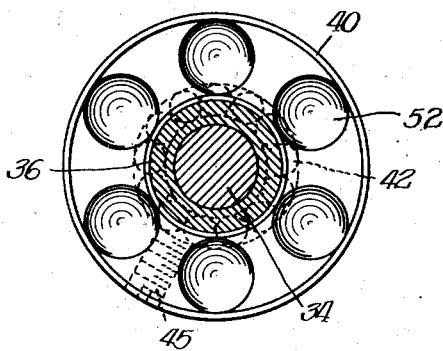
INVENTOR.
Frithiof P. Forss Patented Aug. 28, 1951

2,566,183

UNITED STATES PATENT OFFICE 2,566,183

PORTABLE POWER-DRIVEN TOOL

Frithiof P. Forss, Aurora, Ill., assignor to Skilsaw, Inc., Chicago, Ill., a corporation of Delaware Application May 29, 1947, Serial No. 751,245

2 Claims. (Cl. 74—421)

The present invention relates to improvements in a rotary power driven portable tool.

Heretofore in tools of this nature it has been customary to arrange a power motor and the driven shaft in axial alignment, or if a gear reduction was required the motor and shaft might be offset to permit the introduction of a gear train therebetween but the shaft and motor were still arranged one behind the other. These tools have operated well in open or unconfined spaces but in restricted spaces their use is limited unless sacrifices are made with respect to bearing mountings, wear on parts, power and stability.

In power driven screw drivers it has heretofore been thought necessary to support the clutch mechanism and driven members from only a bearing mounted above the clutch members. The elongated driven members extending outwardly therefrom cause undue wear on the bearing member and permits a tool attachment to wobble preventing accurate precise work as the parts wear. Normally toothed clutches have been used with tooth breakage, expense and undue friction and heat.

One object of the present invention is to provide a portable power tool that may be used in normally inaccessible spaces.

Another object is to provide a portable power tool that will be subject to less wear and have greater stability than those heretofore known.

Another object of the present invention is to provide a portable power tool within a small frame but with large spindle bearings spaced relatively widely apart to minimize wear.

A further object is to provide a portable power tool that is light, compact and can be balanced in the palm of the operator and that yet retains the normal power of longer, heavier tools.

Yet another object of the invention is to provide a portable power tool suitable for driving screws, running nuts or the like with an improved clutch mechanism that is less subject to breakage and over-heating.

A still further object of the invention is to provide a portable power driven tool with a clutch mechanism having less friction between the parts and that is relatively simple and inexpensive to manufacture.

A still further object of the invention is to provide a portable power driven tool for driving screws or nuts having a spindle supporting bearing between the clutch mechanism and the work holding means to centralize and stabilize the spindle while in operation.

Other objects will be pointed out hereinafter with specific reference to the attached drawings wherein one embodiment of the invention is set forth for purposes of exemplification.

In the drawings:

Fig. 1 is a view in vertical section through a tool embodying the invention.

Fig. 2 is an enlarged view in section of two of the clutch members at a 90° angle to the view shown in Fig. 1.

Fig. 3 is a view taken on line 3—3 of Fig. 1 and

Fig. 4 is a view taken on line 4—4 of Fig. 1.

In achieving the objects of this invention, applicant has conceived of a novel arrangement of parts whereby the power and stability of the normal two hand operated portable electric or pneumatic drill, screw driver or nut runner is incorporated into a compact, light tool that will fit the palm of an operator and can be operated by one hand.

In accomplishing this the overall length of the tool has been considerably reduced to little more than the length of the motor by placing the driven spindle in a side by side parallel relationship with the motor. Heretofore attempts to reduce length of tools have meant the reduction of the length of the spindle with a sacrifice of supporting bearings or spacing the bearings so closely together and adjacent the work holder that there has been undue wear on the bearings and a consequent wobble in the spindle shaft.

In applicant's invention the spindle may be as long or slightly longer than the required motor and the bearing mounting may be widely spaced giving more stability and much less wear. Also the gear train instead of being spaced axially between the motor and spindle may instead be mounted in the normally waste space of the handle portion and cap the ends of the spindle and motor shafts, likewise reducing length without losing power or efficiency.

Where used in connection with driving screws or running nuts normally a clutch mechanism is incorporated wherein oppositely disposed clutch teeth may ratchet over each other when a predetermined torque has been built up. Unwanted heat is created by the friction of the parts and the teeth are subject to breakage with consequent repair and expense. The present invention contemplates the use of roller members between the clutch members, eliminating tooth breakage and minimizing friction. The roller members may fit partially into oppositely disposed pockets or depressions in the clutch faces. Upon the building up of a predetermined torque one clutch face will ride up over the roller members and its depressions will ratchet over the roller members in the depressions of the other clutch face. To retain the roller members in one clutch face, the depressions may be made slightly deeper in that face.

With reference to the drawings, it will be noted that the invention is disclosed with reference to a pneumatically powered tool. Housing 10 is divided into a motor chamber 12 in which is mounted a rotor 14, and a spindle chamber 16 in which is mounted a spindle mechanism generally designated as 18.

A rear handle housing member 20 closes the rear portion of housing 10 and contains a gear train 22.

At the lower end of handle housing 20 there is an air inlet nipple 25 for attachment to the usual pneumatic air hose. Upon pressing the trigger mechanism 26 the valve ball 27 is pressed away from its closed position as shown against the pressure of spring 28 allowing air under pressure to pass into the motor chamber 12 and operate the rotor 14. The air inlet mechanism and rotor and their operation are described in my copending application Serial No. 618,047 filed September 22, 1945, now Patent No. 2,545,453, and form no part of my present invention.

Rotor 14 has a shaft and pinion 15 extending rearwardly thereof and substantially into the rear handle portion. Gear train 22, suitably mounted in the handle portion, is operatively connected to pinion 15 at one end and at the other to gear 19 formed on the rear end of spindle 18.

This spindle is mounted parallel to the axis of rotor 14 and alongside thereof. At its rear it is mounted in bearing 30 in housing 10 and at its forward end it is rotatably mounted in bearing 32 spaced widely from bearing 30 and giving stability through the entire length of the spindle. The spindle includes the shaft 34 extending into and slidably and rotatably supported in sleeve member 36, the latter being made hollow for this purpose. Shaft 34 has a plurality of clutch teeth 38 formed therearound for cooperation with clutch teeth 39 formed on the opposed face of clutch member 40. This clutch member 40 is keyed to the inner end of sleeve 36, so that it may rotate with respect thereto but cannot move axially in relation to the sleeve, through means of a number of balls 42 fitting half in each of circumferential grooves 43 and 44 in the clutch member 40 and sleeve 36 respectively. Screw plug 45 (Fig. 2) closes an opening in the clutch member through which the balls are inserted into the grooves on assembly.

A further clutch member 46 is slidably mounted to sleeve 36 but keyed against rotation relative thereto through the provision of two sets of ball keys 47, 47 fitting half in each of longitudinal grooves 48 and 49 of the sleeve 36 and clutch member 46 respectively as shown in Fig. 2.

Spring member 50 encircles sleeve 36 and abuts at one end against washer 51 adjoining bearing 32 and at its other against clutch member 46 forcing the latter normally up against its opposed clutch member 40 as shown in Fig. 1. The opposed faces of these clutch members 40 and 46 have a plurality of oppositely disposed conical depressions 52, 53 respectively. Depressions 52 in the face of clutch member 40 may be of a similar size to depressions 53 but preferably are of a greater depth as through the use of counter bores 54 so that a greater portion of roller members balls 55 may be received within the confines of the clutch member 40 depressions than within the depressions of clutch member 46.

For instance it has been found among other things that with the use of balls 55 of a quarter inch in diameter that a satisfactory ratcheting clutch effect may be produced if the sides of the depressions 52, 53 have a 90° angle and a ball 55 projects .150 inch from the face of clutch member 46 and .100 inch from the face of clutch member 40. In other words the depressions 53 preferably are more shallow than depressions 52 so that more than 180° of a ball circumference may be received within a depression 52.

At its lower end sleeve 36 is provided with work holder means such as for the screw driver bit 58. Between the inner end of shaft 34 and the inner end of hollow sleeve 36 a spring member 60 can be interposed of a strength sufficient to normally press sleeve 36 outwardly away from shaft 34 to disengage teeth 39 of clutch member 40 and teeth 38 on shaft 34 except when the tool is in operation.

Also shown is a finder housing 62 receiving a finder member 64 slidably enclosed therein which is normally pressed outwardly to cover the end of bit 58 by spring member 66 that abuts against the inner end of finder 64 and against threaded clamp ring 68 that screws into the forward end of housing 10 to hold the spindle assemblage together and receives and holds the finder housing in proper relationship.

The tension of spring 50 and the consequent pressure between clutch members 40 and 46 may be adjusted by tension nut 70 threaded to sleeve 36 and abutting against sleeve 72 which moves upon tightening nut 70 to force the washer 51 against spring 50 compressing the same.

In operation when motor 14 is started as by pressing trigger 26, shaft 34 of spindle revolves by means of the gear train 22 located at the rear of the motor and spindle and substantially in the handle portion of the tool. As the tool is pressed against a work piece such as a screw the finder housing will be retracted slightly permitting the bit to come into contact with the screw kerf.

Further pressure presses the bit and sleeve member 36 and its accessory clutch members inwardly against the action of spring 60 until teeth 39 on clutch member 40 engage with teeth 38 on shaft 34. Clutch member 40 then commences to rotate with shaft 34, rotating clutch member 46 with it through means of the balls 55 seated in opposed depressions 52 and 53 in the clutch members. As clutch member 46 is keyed to sleeve 36 through the balls 47, the sleeve 36 rotates driving the bit member 58.

When a screw is tightened to a predetermined degree, the torque exerted on clutch members 46 and 40 will cause the clutch member 46 having the shallower depressions 53 to ride up against the pressure of spring 50 on balls 55 and over the same snapping over and on to the balls in their respective depressions 52 in a ratcheting action, driving home the screw and warning the operator to relieve the pressure as the screw is drawn tight. The balls of course are retained in their respective deeper depressions 52 with shallower depressions 53 ratcheting thereover.

It has been found that there is much less friction and wear through the use of these balls that may roll than through the use of ratcheting toothed clutches and much less heat is developed.

Heretofore to applicant's knowledge only one bearing member such as 30 has been used in tools of the type shown in an effort to save in over-all length. Because of the arrangement of parts stability has been increased and overall length reduced even with the insertion of an additional bearing member 32 spaced substantially from bearing 30 and adjacent the work holding means.

While one embodiment of the invention has been shown and described, other embodiments will be apparent to those skilled in the art without departing from the spirit or scope of the invention.

I claim:

1. A portable hand-held tool of the type described, including a main housing having a driving motor and a spindle mounted side by side therein in spaced relationship, said motor and spindle having pinion members extending to the rear, said spindle pinion being contained within the main housing, a rear handle housing in the form of a pistol grip closing the rear of said main housing, the motor pinion extending into said handle housing and a gear train mounted at least in part in said handle housing and partially extending into said main housing operatively connecting said pinion members together.

2. A portable hand-held tool of the type described, a main housing, a driving motor including a shaft and a driving pinion extending to the rear thereof, a driven spindle mounted alongside of and in spaced substantially parallel relationship to said motor, and having work performing means at its forward end and a driven pinion extending to the rear thereof, all of said aforementioned parts being mounted within the main housing, a gear train operatively connecting said motor and spindle pinions, a rear housing in the form of a pistol grip, and means for mounting said gear train partially in said rear housing and partially in said main housing.

FRITHIOF P. FORSS.

REFERENCES CITED

The following references are of record in the file of this patent:

UNITED STATES PATENTS

| Number | Name | Date |
|---|---|---|
| 1,217,815 | Payne | Feb. 27, 1917 |
| 1,407,622 | Backscheider | Feb. 21, 1922 |
| 1,683,715 | Erban | Sept. 11, 1928 |
| 1,789,559 | Meunier | Jan. 20, 1931 |
| 1,858,276 | Miller | May 17, 1932 |
| 1,864,844 | Meunier | June 28, 1932 |
| 2,127,855 | Baumgratz et al. | Aug. 23, 1938 |
| 2,152,517 | Whitney et al. | Mar. 28, 1939 |
| 2,184,394 | Moretti | Dec. 26, 1939 |
| 2,209,155 | Fagg | July 23, 1940 |
| 2,506,835 | Johnson | May 9, 1950 |

FOREIGN PATENTS

| Number | Country | Date |
|---|---|---|
| 751,817 | France | Sept. 11, 1933 |